US007174171B2

(12) United States Patent

Jones

(10) Patent No.: US 7,174,171 B2
(45) Date of Patent: Feb. 6, 2007

(54) VEHICLE OCCUPANT RESPONSE SYSTEM

(75) Inventor: Alan Henry Jones, Histon (GB)

(73) Assignee: AT&T Corp., New York, NY (US)

( * ) Notice: Subject to any disclaimer, the term of this patent is extended or adjusted under 35 U.S.C. 154(b) by 577 days.

(21) Appl. No.: 10/232,304

(22) Filed: Aug. 30, 2002

(65) Prior Publication Data

US 2003/0079135 A1 Apr. 24, 2003

(30) Foreign Application Priority Data

Sep. 1, 2001 (GB) ................................ 0121219.0

(51) Int. Cl.
*H04B 7/00* (2006.01)

(52) U.S. Cl. ............................... 455/456.1; 455/569.2; 455/466; 455/424; 455/550.1; 701/1; 701/207; 340/539.13

(58) Field of Classification Search ............ 455/404.2, 455/415, 466, 550.1, 414.2, 456.1–456.6, 455/569.2, 344–345, 422.1, 424; 340/988–992, 340/539.1, 539.11, 539.13; 701/1, 207, 200–201, 701/213

See application file for complete search history.

(56) References Cited

U.S. PATENT DOCUMENTS

| | | | |
|---|---|---|---|
| 3,720,911 A | 3/1973 | Bomar, Jr. | 340/52 F |
| 6,070,123 A | 5/2000 | Beyer et al. | 701/209 |
| 6,292,747 B1 * | 9/2001 | Amro et al. | 701/213 |
| 6,362,730 B2 * | 3/2002 | Razavi et al. | 340/438 |
| 6,363,323 B1 | 3/2002 | Jones | |
| 6,526,335 B1 * | 2/2003 | Treyz et al. | 701/1 |
| 6,580,916 B1 * | 6/2003 | Weisshaar et al. | 455/456.1 |
| 6,631,271 B1 * | 10/2003 | Logan | 455/456.1 |
| 6,696,919 B1 * | 2/2004 | Leickel et al. | 340/5.74 |
| 6,711,474 B1 * | 3/2004 | Treyz et al. | 701/1 |
| 6,799,155 B1 * | 9/2004 | Lindemann et al. | 703/24 |
| 6,853,853 B1 * | 2/2005 | Van Wiemeersch et al. | 455/569.2 |
| 6,917,800 B1 * | 7/2005 | Rychlak | 455/418 |
| 6,980,812 B1 * | 12/2005 | Sandhu et al. | 455/456.1 |
| 7,050,795 B2 * | 5/2006 | Wiegand et al. | 455/569.2 |
| 2003/0034873 A1 * | 2/2003 | Chase et al. | 340/5.2 |

FOREIGN PATENT DOCUMENTS

| | | |
|---|---|---|
| EP | 1085696 A1 | 3/2001 |
| GB | 2356960 | 6/2000 |
| JP | 2000209651 | 7/2000 |
| WO | WO 00/42562 | 7/2000 |

OTHER PUBLICATIONS

WO 00/42562 Jones; filed Jan. 12, 2000; publ. date Jul. 20, 2000; first page attached.
WO 01/43460 Meissner; filed Nov. 21, 2000; publ. date Jun. 14, 2001; first page attached; English abstract attached; no translation.
JP 2002216270 Koji; publ. date Feb. 8, 2002; first page attached; abstract not available; no translation.

* cited by examiner

*Primary Examiner*—Joseph Feild
*Assistant Examiner*—Kamran Afshar

(57) ABSTRACT

In a vehicle occupant response system, a vehicle navigation system supplies a vehicle location information to a computer which formulates messages for SMS transmission by a cellular telephone device. The messages are relayed by a GSM network to an Internet server. The server identifies a user account, for example from the telephone number of the device embedded in each message. The server then runs an application which is specific to a user which may comprise sending messages containing desired information to the vehicle and making available the current location of the vehicle to a user of a personal computer.

3 Claims, 1 Drawing Sheet

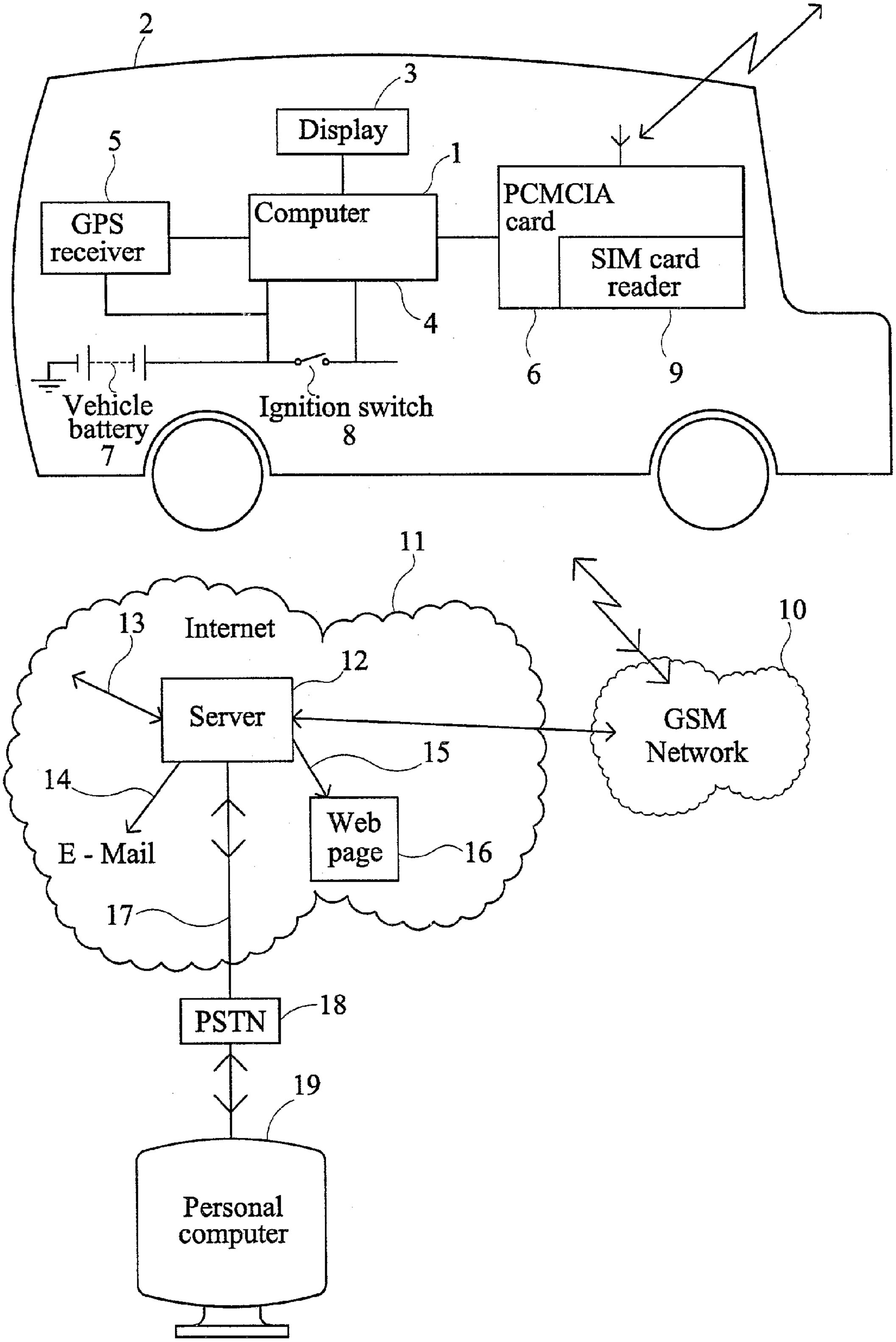
2
3
Display
5
1
GPS receiver
Computer
PCMCIA card
SIM card reader
4
6
9
Vehicle battery
7
Ignition switch
8
11
10
Internet
13
12
Server
GSM Network
15
14
E - Mail
Web page
16
17
PSTN
18
19
Personal computer

VEHICLE OCCUPANT RESPONSE SYSTEM

FIELD OF THE INVENTION

The present invention relates to a vehicle response system.

BACKGROUND INFORMATION

Vehicle response systems of various types are known and examples of these are disclosed in GB 2 356 960, WO 00/42562, EP 1 085 696, U.S. Pat. No. 6,070,123, U.S. Pat. No. 3,720,911 and JP 2 000209651. In such systems, a message identifying a vehicle is transmitted wirelessly to some remote point and results, for example, in a predetermined application being formed, which application is standard and is common to all enquiries from all vehicles. Such systems are therefore relatively inflexible and do not permit "tailored" responses to be performed.

SUMMARY OF THE INVENTION

According to the invention, there is provided a vehicle occupant response system comprising:

a reader located on board a vehicle and arranged to read identifying information sufficient to identify a person;

a wireless transmitter located on board the vehicle and arranged repeatedly to transmit a first message containing sufficient of the identifying information to identify a user account of the person on a server; and a server located remotely from the vehicle and arranged to receive each first message, to identify the user account from each first message, to permit an application to be specified by the person, and to perform in response to receipt of each of at least some of the first messages the application specified by the person.

The system may comprise a wireless receiver located on board the vehicle for receiving second messages from the server. The application may comprise sending the second messages to the receiver. Each second message may contain information in at least one category selected by the user.

The application may comprise sending a third message to an address previously selected by the user. The address may comprise a private address, such as an e-mail address. The address may comprise a public address. The application may comprise updating a web page.

The transmitter may be arranged to communicate over a cellular telephone network. The reader may be a SIM card reader. The account identifying information may be a telephone number read from a SIM card. The receiver may be arranged to communicate over the network The account identifying information may comprise a code, such as a vehicle registration number, identifying the vehicle. The server may have a user-programmable index for associating the code with the user account.

The server may comprise an internet server.

Each first message may contain location data representing the location of the vehicle. The transmitter may have an interface for receiving the location data from an on-board vehicle navigation system.

It is thus possible to provide a system which responds to messages from a vehicle by performing an application specific to a user such as a vehicle occupant. For example, information which the occupant specifically requires can be forwarded to the vehicle while on route. Where the vehicle also sends information about its location, traffic information relevant to the vehicle route can be sent to the vehicle, for example so that the occupant can choose an alternative route to avoid traffic jams. The occupant can arrange for vehicle location information to be sent elsewhere to allow others to monitor progress on a journey. By providing an indication of when the vehicle has been parked, messages and telephone calls can be made so as to avoid distracting the occupant when driving the vehicle.

BRIEF DESCRIPTION OF THE DRAWING

The invention will be further described, by way of example, with reference to FIG. 1 of the accompanying drawing, which is a schematic diagram illustrating a system constituting an embodiment of the invention.

DETAILED DESCRIPTION

The drawing shows an on-board navigation system in the form of a computer 1 installed in a vehicle 2 and provided with a display 3 for displaying navigation (and other) information generated or supplied by the computer 1 to vehicle occupants (not shown). The navigation system further comprises a GPS receiver 5 connected to the computer 1 for supplying navigation data thereto. For example, the computer 1 may be a Pentium® based computer with remote display known as "Part No. CAR PC" available from Kontron and the GPS receiver may be a "Placer GPS 455" available from Trimble and comprising a GPS receiver with odometer and rate gyro inputs.

The computer 1 is provided with a wireless messaging system in the form of a PCMCIA card 6. The card 6 is, for example, a Nokia® Card Phone Type RPE-1 and implements all of the cellular protocols including SMS text messaging. The card 6 receives power from the computer 1 and powers up and down automatically with the computer. The card 6 has a SIM card reader 9 for reading a SIM card of an occupant of the vehicle 2. Messages generated by the computer 1 are transmitted as SMS messages by the card 6 to a GSM network 10.

The computer 1 and the receiver 5 are supplied with power from a vehicle battery 7. The computer 1 has a control input connected to the battery 7 via a vehicle ignition switch 8. The computer 1 remains dormant when the switch 8 is off and is automatically booted when the switch 8 is turned on. When the ignition switch 8 is turned off, the computer runs for a predetermined time, for example of the order of a minute, before returning to its standby mode.

The messages sent by the card 6 to the network 10 contain an identifier, which is a code or the like identifying an occupant of the vehicle 2. For example, the occupant inserts a SIM card in the reader 9, which reads and stores a telephone number which is "known" to the network and which identifies the occupant. This telephone number is embedded in messages transmitted by the card 6 and is used to identify the occupant of the vehicle 2.

The network 10 is connected to a server 12 of the internet (Internet) 11 so that messages from the card 6 are relayed to the server 12 and messages from the server 12 are relayed to the card 6. The server 12 runs one or more applications which have previously been selected by or customised for the occupant of the vehicle. In practice, the server 12 may be arranged to run applications for many different individuals such that each application is customised for each individual and is called in response to receipt of a message with the occupant identifier. In other words, the server 12 can serve many different occupants at the same time with a customised or personal application for each occupant of a vehicle 2.

The server 12 has a connection 13 for communication with other applications and/or other servers of the internet 11. The server 12 also has a connection shown at 14 for sending e-mails and a connection 15 to a web page 16 so that the page can be updated by the server 12 but is accessible for reading by anyone connected to the internet 11.

The server 12 is shown with a particular connection 17 via the public switched telephone network (PSTN) 18 to a personal computer 19. The server 12 may establish this connection, for example as part of running a particular application for a particular vehicle occupant. Alternatively, the connection may have been established by a user of the computer 19.

While the vehicle 2 is, for example, being driven such that the ignition switch 8 is turned on, the computer 1 is arranged to cause the card 6 to send messages, for example every five minutes. The receiver 5 supplies navigation information to the computer 1 which forms a text message, two examples of which are:

"CARPOSN E640AGK Sun Aug 19 18:44:05 2001 52.08027N 0.00347E 537385E 244333N 53.7 mph 027 deg M11 4.1 km NE of Royston"

"CARPOSR Received: E640AGK Sun Aug 19 13:32:33 2001 51.87563N-0.20082E 523950E 221208N 67.1 mph 165 deg A1M near Stevenage"

Where the fields are:

"CARPOSN" The tag for the message, saying that this is a vehicle position, and that the road is unknown (N) or known (R);

"E640AGK" The registration number of the vehicle;

"Sun Aug 19 18:44:05 2001" The date and time of the report;

"52.08027N 0.00347E" The location of the vehicle as latitude and longitude;

"537385E 244333N" The location of the vehicle in Ordnance Survey Grid coordinates; "53.7 mph 027 deg" The speed and direction of travel of the vehicle;

"M11" The nearest major road known to the vehicle; and

"4.1 km NE of Royston" A text description of the location.

The server 12 receives this message and determines, for example by accessing an SMS server of the internet 11, that the cellular telephone number embedded in the message represents the identity and presence of a particular occupant of the vehicle 2. The messages are then processed specially for that occupant by means of a particular application on the server 12 associated with the occupant. For example, the application sends messages intended for the occupant to the computer 1 via the network 10 and the card 6 and sends messages to other destinations previously selected or programmed by the occupant or on his or her behalf. The following description gives examples of services which are available for selection to any occupant.

The server 12 logs each message and makes the text location available, for example on the web page 16 or at one or more selected e-mail addresses. For example, the server 12 may send the text by e-mail via the connection 17 and the PSTN 18 to the computer 19. A user of the computer 19 may read the message in order to be aware of the present location of the occupant of the vehicle 2. The coordinate information may be made available for displaying the vehicle location on a map which is also accessible on the internet 11.

The server 12 sends replies to the vehicle 2 in the form of messages containing information required by the occupant. For example, traffic reports on the internet 11 may be obtained by the connection 13 and sent to the occupant. Such reports are based on the current location of the vehicle 2 as communicated to the server 12 and allow the occupant to be aware of any potential traffic problems so that re-routing of the vehicle 2 may be performed to avoid such problems. The server 12 may send messages containing other information available on the internet 11 and required by the user while in the vehicle 2. For example, if the occupant requires share information, this can be requested by means of a message from the card 6 or may have been selected by the occupant prior to beginning a journey. The server 12 can obtain the appropriate information from elsewhere on the internet 11 and relay this to the occupant in the form of messages via the network 10 and the card 6 to the computer 1 for display on the display 3.

Another example of an application which can be performed by the system is to track the position of the vehicle 2 and make this available publicly or only to selected destinations or addresses for private access. For example, the computer 19 sends to the server 12 a request of the form "TRACK n", where "TRACK" is an instruction to begin the tracking application and "n" is interpreted by the application on the server 12 as the number of seconds between consecutive sightings. The vehicle system sends the vehicle location and velocity information (as illustrated above) every n seconds to the telephone or e-mail account which sent the "TRACK" message. Thus, people expecting visitors known to be in a particular vehicle can monitor the progress of the vehicle by visiting the web page 16 or by issuing the TRACK request and can send messages to the occupants, for example containing useful information or confirmation that they are aware that the journey will be delayed.

As an alternative, any cellular telephone may issue a TRACK n request and the vehicle systems will send the vehicle location and velocity information to the telephone which made the request. Thus, a vehicle which may have been stolen can be tracked from any telephone.

It is also possible for such a system to provide a security feature for the vehicle 2. For example, if the ignition switch 8 is turned on and a specific action is not taken to disable the security feature, an automatic notification can be sent by text message to further nominated telephones or e-mail accounts. The specific action may, for example, comprise manually actuating a control button of the on-board systems before any others and within a predetermined time, such as two minutes. However, other specific actions are possible, such as detection of a personal tag or recognition that the vehicle is on a common or permitted route. If the vehicle may have been stolen, the progress of the vehicle may be monitored by means of the TRACK request or by watching a web page displaying the periodic location reports.

Another example of an application which may be performed is initiated by the occupant sending a suitable message after the vehicle 2 has been parked. For example, a text message "CARPOSP" (standing for car position parked) may be sent manually by actuating a control button or may be sent automatically when the ignition switch 8 is turned off. The computer 1 is arranged to remain active, for example, for at least a minute after the ignition switch 8 is turned off to allow time for replies to arrive at the vehicle and for appropriate actions to be taken. The fact that the vehicle has been parked can be processed by the server 12 as described above so that, for example, this information is made available to a user of the computer 19. The user then knows that the occupant is not driving the car so that text messages or telephone calls may then be directed to the occupant, who is able to receive them and take whatever action is appropriate while the vehicle is stationary.

What is claimed is:

1. A vehicle information system for providing user-specified and location-specific information services during the course of the vehicle's journey, comprising:

a reader located on board a vehicle and arranged to read identifying information sufficient to identify a person;

a wireless transmitter located on board said vehicle and arranged repeatedly during the course of the vehicle's journey to transmit a first message;

said first message:

containing sufficient of said identifying information to identify a user account of said person on a server; and containing location data from an on-board vehicle navigation system representing a location of said vehicle;

a server located remotely from said vehicle and arranged to receive each said first message, to identify said user account from each said first message, to permit an application available to said identified user account to be specified by said person from a plurality of applications available through the server, and to perform in response to receipt of each of at least some of said first messages said application specified by said person; and a wireless receiver located on board said vehicle for receiving second messages from said server;

said application specified by said person sending said second messages to said wireless receiver;

each said second message containing information in at least one category selected by said person and including information based on the current vehicle location;

said specified application further sending a third message to an address, external to the server, that was previously selected by said person, said third message including tracking information relating to the location of said vehicle enabling others selected by said person and adapted for receiving information at the user selected address to monitor the progress of the vehicle;

wherein the third message sent to the selected address contains information indicating when the vehicle has been parked, thereby indicating that messages and telephone calls can be made to the vehicle so as to avoid distracting the occupant while driving the vehicle.

2. A system as claimed in claim 1, in which said address previously selected by said person for said third message sent by the application selected by the person comprises an e-mail address accessible with a personal computer.

3. A system as claimed in claim 1, in which said address previously selected by said person for said third message sent by the application selected by the person comprises a Web page address displaying vehicle location information accessible to those having access to the Web page.

* * * * *